(12) United States Patent
Lewis et al.

(10) Patent No.: US 9,199,287 B2
(45) Date of Patent: Dec. 1, 2015

(54) VALVELESS PASSIVE GAS VENT FOR LANDFILLS

(71) Applicants: Delaney Lewis, West Monroe, LA (US); Jose Urrutia, Suwanee, GA (US); Michael Ayers, Alpharetta, GA (US)

(72) Inventors: Delaney Lewis, West Monroe, LA (US); Jose Urrutia, Suwanee, GA (US); Michael Ayers, Alpharetta, GA (US)

(*) Notice: Subject to any disclaimer, the term of this patent is extended or adjusted under 35 U.S.C. 154(b) by 0 days.

(21) Appl. No.: 13/792,687

(22) Filed: Mar. 11, 2013

(65) Prior Publication Data

US 2014/0255101 A1  Sep. 11, 2014

(51) Int. Cl.
*B09B 1/00* (2006.01)

(52) U.S. Cl.
CPC ...................... *B09B 1/006* (2013.01)

(58) Field of Classification Search
CPC ...................................... B09B 1/006
See application file for complete search history.

(56) References Cited

U.S. PATENT DOCUMENTS

| | | | |
|---|---|---|---|
| 3,593,478 A * | 7/1971 | Mason | 52/252 |
| 3,941,556 A | 3/1976 | Pallagi | |
| 4,483,641 A * | 11/1984 | Stoll | 588/249 |
| 4,487,054 A | 12/1984 | Zison | |
| 4,518,399 A | 5/1985 | Croskell et al. | |
| 4,596,491 A * | 6/1986 | Dietzler | 405/154.1 |
| 4,690,041 A * | 9/1987 | Banks et al. | 454/176 |
| 5,221,159 A | 6/1993 | Billings et al. | |
| 5,259,697 A * | 11/1993 | Allen et al. | 405/129.9 |
| 5,588,490 A | 12/1996 | Suthersan et al. | |
| 5,893,680 A * | 4/1999 | Lowry et al. | 405/128.2 |
| 6,305,473 B1 | 10/2001 | Peramaki | |
| 6,742,962 B2 | 6/2004 | Hater et al. | |
| 6,749,368 B2 | 6/2004 | Ankeny et al. | |
| 6,910,829 B2 | 6/2005 | Nickelson et al. | |
| 7,153,061 B2 | 12/2006 | Nickelson et al. | |

(Continued)

FOREIGN PATENT DOCUMENTS

| | | |
|---|---|---|
| EP | 2361698 A1 | 8/2011 |
| GB | 589815 | 7/1947 |

(Continued)

OTHER PUBLICATIONS

International Search Report and the Written Opinion of the International Searching Authority; for International Application No. PCT/US14/26065; Aug. 11, 2014; 12 pages; International Searching Authority/United States, Alexandria, US.

(Continued)

*Primary Examiner* — John Kreck
(74) *Attorney, Agent, or Firm* — Gardner Groff Greenwald & Villanueva, PC

(57) ABSTRACT

A passive valveless gas vent for a landfill includes a sub-surface gas collection manifold for collecting sub-surface gas from beneath a geomembrane. The collection manifold includes a plenum for receiving sub-surface gas, and the plenum defines an interior volume. A conduit is connected to and extends upwardly from the plenum, with the conduit communicating with the interior volume of the plenum and having an upper discharge end. The conduit is adapted and provided for extending through an aperture in the geomembrane for communicating sub-surface gas from within the interior volume of the plenum through the geomembrane. A hood is positioned adjacent an upper portion of the conduit and defines a discharge chamber therein into which gas from the discharge end of the conduit is discharged. The hood also has a discharge outlet for venting gas from within the discharge chamber to atmosphere.

18 Claims, 5 Drawing Sheets

(56) References Cited

U.S. PATENT DOCUMENTS

| | | |
|---|---|---|
| 7,198,433 B2 | 4/2007 | Augenstein et al. |
| 7,309,431 B2 | 12/2007 | Degarie |
| 7,448,828 B2 | 11/2008 | Augenstein et al. |
| 7,722,289 B2 | 5/2010 | Leone et al. |
| 7,972,082 B2 | 7/2011 | Augenstein et al. |
| 8,002,498 B2 | 8/2011 | Leone et al. |
| 8,047,276 B2 | 11/2011 | Stamoulis |
| 8,168,121 B2 | 5/2012 | Elkins |
| 8,192,111 B2 | 6/2012 | Zimmel |
| 8,398,335 B2 | 3/2013 | Stamoulis |
| 2003/0008381 A1 | 1/2003 | Augenstein |
| 2003/0111122 A1 | 6/2003 | Horton |
| 2004/0103886 A1 | 6/2004 | Benjey |
| 2004/0112607 A1 | 6/2004 | Beckhardt |
| 2005/0082830 A1 | 4/2005 | Voelker |
| 2005/0236042 A1 | 10/2005 | Hansen et al. |
| 2006/0034664 A1 | 2/2006 | Augenstein |
| 2007/0243023 A1* | 10/2007 | Augenstein et al. ..... 405/129.95 |
| 2008/0017558 A1 | 1/2008 | Pollock et al. |
| 2009/0136298 A1 | 5/2009 | Augenstein et al. |
| 2011/0302876 A1* | 12/2011 | Giffin .......................... 52/741.4 |

FOREIGN PATENT DOCUMENTS

| | | |
|---|---|---|
| JP | 11216440 A | 8/1999 |
| JP | 2003340392 A | 12/2003 |
| WO | 2007/103153 A3 | 9/2007 |
| WO | 2008/061294 A1 | 5/2008 |
| WO | 2011148139 A3 | 11/2012 |

OTHER PUBLICATIONS

Barometrically Enhanced Remediation Technology (BERT); Innovative Technology Summary Report, Mar. 2000, 28 pages, Prepared for U.S. Department of Energy, Office of Environmental Management, Office of Science and Technology, US.

International Search Report and the Written Opinion of the International Searching Authority; for International Application No. PCT/US14/22991; Jul. 3, 2014; 8 pages; International Searching Authority/United States, Alexandria, US.

* cited by examiner

VALVELESS PASSIVE GAS VENT FOR LANDFILLS

BACKGROUND

As waste material decomposes in a landfill, it gives off various gases. In the past, it has been known to use pumps, piping, and wellheads to extract the gases from the landfill and collect the same. Such wellheads are often spaced about one per acre in a grid pattern. Such systems of collecting the gases can be shut down by many factors, including power failures. To prevent the undesirable build-up of such gases in the event of non-operation of the extraction system, it has often been known to employ a grid pattern of vents spaced between the extraction wellheads, often at the same one per acre density.

As described in published U.S. Patent Application Number 20060034664, conventional gas extraction wells at landfills often involve deep wells attached to a network of pipes and a gas pump (blower) that applies vacuum (negative pressure) to extract the gas from the stored waste as the waste decomposes. The profile of surface emission flux is recognized to lead to potential for some emissions away from the wells under many circumstances. Note also that there is almost always entrainment of gas, whether LFG or atmospheric air, through the surface area most proximate to deep collection. Both LFG emission far from wells, and air entrainment proximate to subsurface collection, are well recognized as deleterious to collection efficiency. A "tradeoff" exists between extracting or "pulling" at too high a flow rate and entraining excessive atmospheric air, and pulling too little and recovering less LFG. This poses one dilemma of conventional extraction.

A prior art arrangement according to the above published patent application is shown in FIG. 1. Landfill 1 containing waste 2 generates biogas (biogas flows shown by the arrows). Biogas is collected and extracted through a well 3. The well 3 includes a gas-collecting well screen 16 and a gas-impermeable conduit 17 linking the well screen to the surface to draw biogas from the wellhead to the surface. Overlaying the majority of the waste 2 is a gas-permeable layer 5. The term "wellhead" refers to a portion of the gas-extraction well from which gas can be extracted. The well often includes a section of pipe having slots or other gas-flow apertures cut in it, referred to as a "well screen". Often, the well screen is also surrounded with gravel. The gas-permeable layer is typically composed of a conductive porous matrix with gas flow paths. Often it is composed of rigid or semi-rigid particles of a large enough size to leave a significant void volume between particles. For instance, the gas-permeable layer may contain sand, gravel, wood chips, or shredded tires. Above the gas-permeable layer is a gas-containment layer 7. Biogas that rises from the landfill reaches the gas-permeable layer where it is trapped by the overlying gas-containment layer 7. The biogas migrates horizontally in the gas-permeable layer until it comes close to a well. Gas extraction from the well creates a vacuum that draws gas into the well. This vacuum draws biogas from the overlying gas-permeable layer down through the waste mass of the landfill to reach the well. The area immediately beneath the gas-permeable high conductivity layer 5 through which a substantial fraction of the biogas from the gas-permeable layer passes as it travels to the gas-collection wellhead is the entrainment zone 9. On its passage through the waste 2, the gas from the gas-permeable layer mixes with biogas produced in the waste mass that has not gone through the gas-permeable layer. This helps to give a consistent content to the biogas that is withdrawn from the well. If gas is withdrawn directly from the gas-permeable conductive layer, the gas composition will vary more dramatically over time, sometimes containing a high air content and sometimes not. It is sometimes desirable to place an even more impermeable layer, such as geomembrane 15, directly over the zone of entrainment of gas from the permeable layer that is created by the deep well. Moreover, sometimes the entire landfill is covered with such a membrane.

When such gas extraction from landfills is interrupted, such as by power outages or equipment failure, it is important to continue to remove the gas from the landfill, to prevent the gas from building up and destabilizing the covering. As described above, the use of passive vents has been common. Such passive vents often take the form of a pipe stuck in the ground with a turned-down upper end to prevent rain from entering the vent. Sometimes such vents have valves in them, other times not. In any event, ideally such a vent should work automatically, whether there is available electric power or not, and be mechanically robust and reliable.

Accordingly, it can be seen that there exists a need for a better way for venting sub-surface gas from near the surface of landfills. It is to the provision of solutions to this and other problems that the present invention is primarily directed.

SUMMARY OF THE INVENTION

In a first example form the present invention comprises a passive valveless gas vent for a landfill. In example embodiments, the passive valveless gas vent includes a sub-surface gas collection manifold for collecting sub-surface gas from beneath a geomembrane. Preferably, the collection manifold includes a plenum for receiving sub-surface gas, and the plenum defines an interior volume. A conduit is connected to and extends upwardly from the plenum, with the conduit communicating with the interior volume of the plenum and having an upper discharge end. The conduit is adapted and provided for extending through an aperture in the geomembrane for communicating sub-surface gas from within the interior volume of the plenum through the geomembrane. A hood is positioned adjacent an upper portion of the conduit and defines a discharge chamber therein into which gas from the discharge end of the conduit is discharged. The hood also has a discharge outlet for venting gas from within the discharge chamber to atmosphere.

Preferably, the hood is affixed to the conduit. Optionally, the hood is substantially cylindrical. Optionally, the conduit is rigidly connected to and extends upwardly from a substantially flat portion of the plenum. Also optionally, the hood includes one or more lower discharge ports.

With such an arrangement, the gas to be vented flows up from the plenum, through the conduit to its upper discharge end. Once exiting the upper end of the conduit and being received in the discharge chamber of the hood, the gas turns downwardly and ultimately exits through the lower discharge ports in the hood.

BRIEF DESCRIPTION OF THE DRAWING FIGURES

DESCRIPTION OF EXAMPLE EMBODIMENTS

The present invention relates to a valveless passive vent for landfill gas, collected using a near-surface collection manifold for venting sub-surface gas. Typically, such gas is trapped beneath a geomembrane M for capping a waste field W. The geomembrane M is generally impermeable to contain or cap the waste below, thereby restricting the sub-surface gas from flowing into the atmosphere and restricting atmospheric air from flowing into the waste below the geomembrane M.

Figure 1:
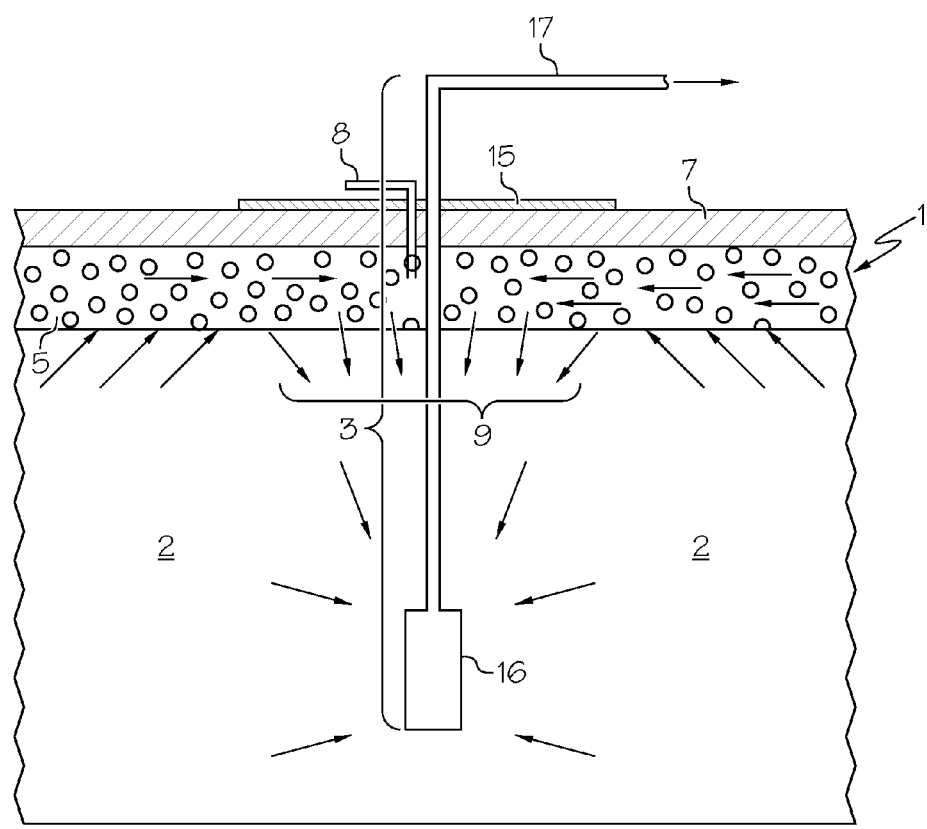
FIG. 1 is a schematic illustration of a first prior art wellhead for extracting sub-surface gas from a waste landfill.
Figure 2:
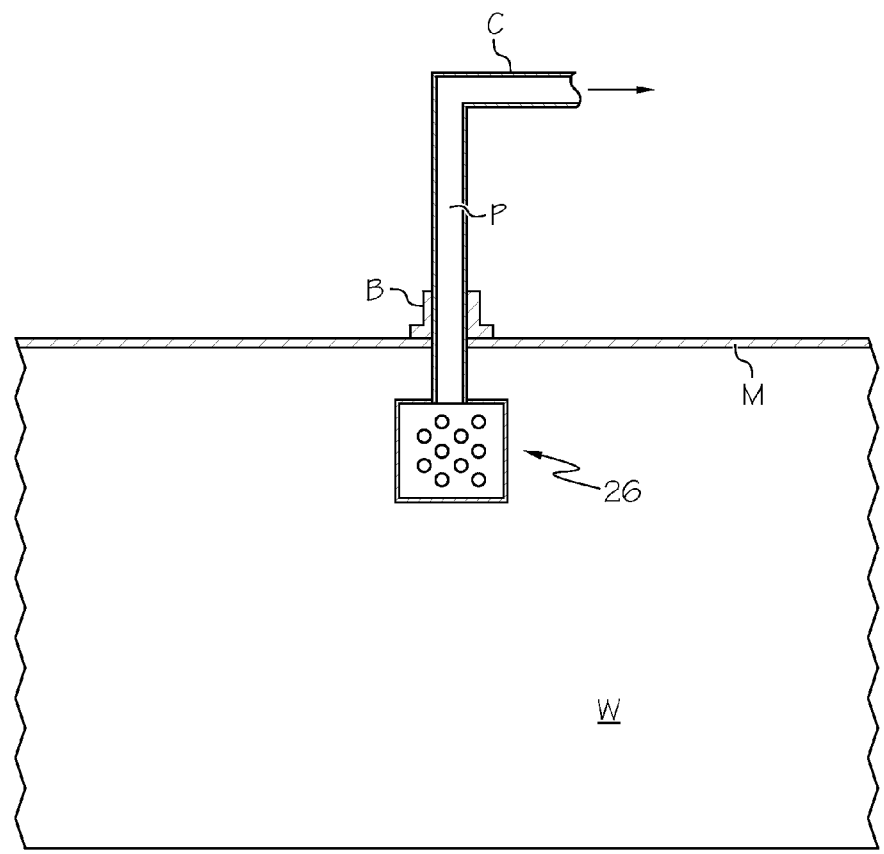
FIG. 2 is a schematic illustration of a second prior art wellhead for extracting sub-surface gas from a waste landfill.
Figure 3:
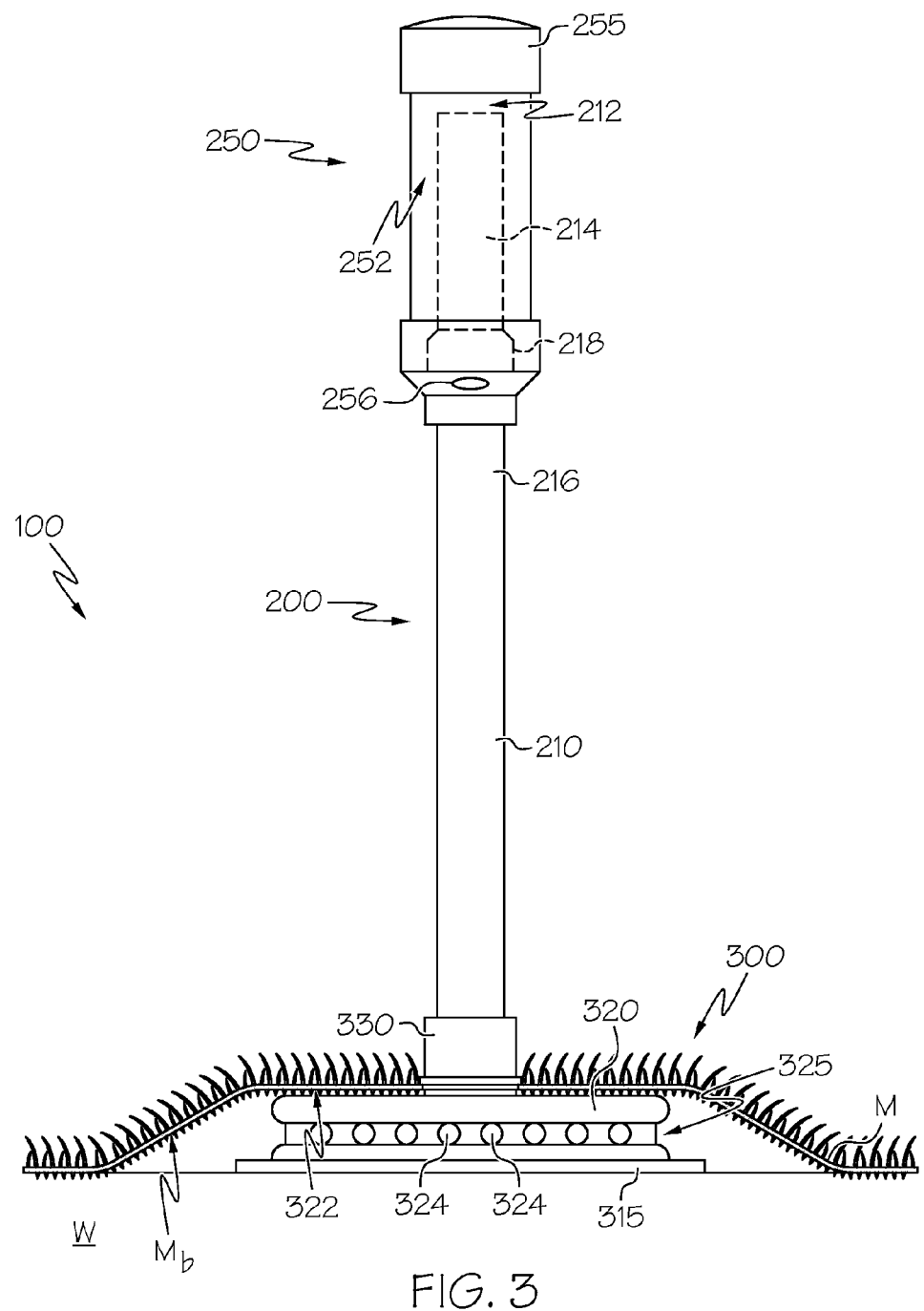
FIG. 3 is a schematic, elevation view of a passive valveless gas vent for a landfill according to a preferred example form of the present invention.

FIG. 3 is a schematic elevation view of a valveless passive vent 100, including an above-ground portion 200 and a sub-surface collection manifold 300 for extracting and/or venting sub-surface gas from a waste landfill according to a preferred example embodiment of the present invention.

The collection manifold 300 includes a generally puck-shaped plenum 320 having an enclosure with a substantially flat upper portion 322 and defines an interior volume, and perforations 324 are formed in the base of a recessed peripheral groove 325 of the plenum to provide for the admission of sub-surface gas into the interior volume. The recessed groove 325 provides good protection against the membrane being drawn against the openings of the perforations 324 and blocking the perforations.

The manifold 300 includes a base plate 315 bonded to the underside of the plenum 320. In one preferred form, the base plate 315 is about 3 feet square and ½ inch thick. The purpose of the base plate 315 is to provide a sturdy base to help keep the manifold upright despite side loads that might tend to want to topple the manifold. Note that the plenum 320 preferably is round, while avoiding sharp corners that might tear the membrane M due to the close proximity of the plenum to the membrane. This is less of a concern with the base plate and the base plate can be provided with generally square corners or rounded corners, as desired. Preferably, both the base plate and the plenum are made of high density polyethylene or similar rugged polymers, but those skilled in the art will appreciate that various construction materials can be employed. In one preferred form, the plenum 320 is about 18 inches across and several inches tall.

When the collection manifold 300 is mounted adjacent the geomembrane M, the plenum 320 sits close below the geomembrane M proximal the waste W, allowing the substantially flat upper portion 322 of the plenum 320 to contact a bottom surface Mb of the geomembrane M. A threaded conduit coupling 330 extends upwardly from the substantially flat upper portion 322 and communicates with the interior volume of the plenum 320 and preferably is rigidly connected to the plenum by plastic welding. Optionally, the conduit coupling 330 can be integrally formed with the plenum. Also, the conduit coupling can have coupling features for mounting to the geomembrane M.

The conduit coupling 330 extends through a central opening of a flat gasket 342 so that the geomembrane M is sandwiched between the flat gasket 342 and the substantially flat upper portion 322 of the plenum 320. Preferably, the flat gasket 342 is formed from a resilient material for providing a compressible seal. In one form, the flat gasket 342 comprises a polymeric sheet having an annular and/or disc-like shape. Alternatively, the flat gasket 342 can be shaped as desired and can comprise other available materials. Optionally, a second flat gasket can be provided such that the geomembrane M is positioned between the two gaskets.

A threaded nut 343 engages external threads of the conduit 330 above the flat gasket 342 and secures the flat gasket 342 against the geomembrane M, thus sealing the geomembrane M to the substantially flat upper portion 322 of the plenum 320. Optionally, a large flat washer is positioned between the threaded nut 343 and the gasket to provide a uniform clamping force and to avoid galling the flat gasket 342 as the threaded nut 343 is tightened. The washer can be a separate item or can be integrally formed on an underside of the nut 343.

A conduit 210 is connected to and extends upwardly from the plenum, with the conduit 210 communicating with the interior volume of the plenum and having an upper discharge end 212. In the example embodiment of FIG. 3, the conduit 210 has an upper portion 214 which is coupled to the lower portion 216 by a coupling 218. However, instead of two pieces connected by a coupling, the conduit 210 can be provided as a single piece. In the example shown in FIG. 3, the lower portion is a length of 4" diameter PVC, while the upper portion is a length of 3" diameter PVC, and they are coupled together with a 4-to-3" coupling 218.

The conduit is adapted and provided for extending through an aperture in the geomembrane for communicating sub-surface gas from within the interior volume of the plenum through the geomembrane. A hood 250 is positioned adjacent an upper portion 214 of the conduit 210 and defines a discharge chamber 252 therein into which gas from the discharge end of the conduit is discharged, the discharge chamber being between the inside wall of the hood and the outside wall of the upper portion of the conduit. The hood 250 also has a pair of discharge outlets, such as discharge outlet 256, for venting gas from within the discharge chamber to atmosphere. (see also discharge outlets 256, 258 shown in FIG. 4). The hood is capped with a weather-proof cap 255.

Preferably, the hood 250 is affixed to the conduit 210 using a 6"-to-4" reducer 262. Optionally, the hood 250 is substantially cylindrical. Optionally, the conduit is rigidly connected to and extends upwardly from a substantially flat portion of the plenum. Also optionally, the hood 250 includes one or more lower discharge ports.

Those skilled in the art will appreciate that the particular sizes and components used herein are for illustrative purposes and that many modifications can be made thereto while still practicing the present invention. For example, in some applications, the size of the piping might need to be increased, while in other applications the piping might need to be smaller.

Figure 4:
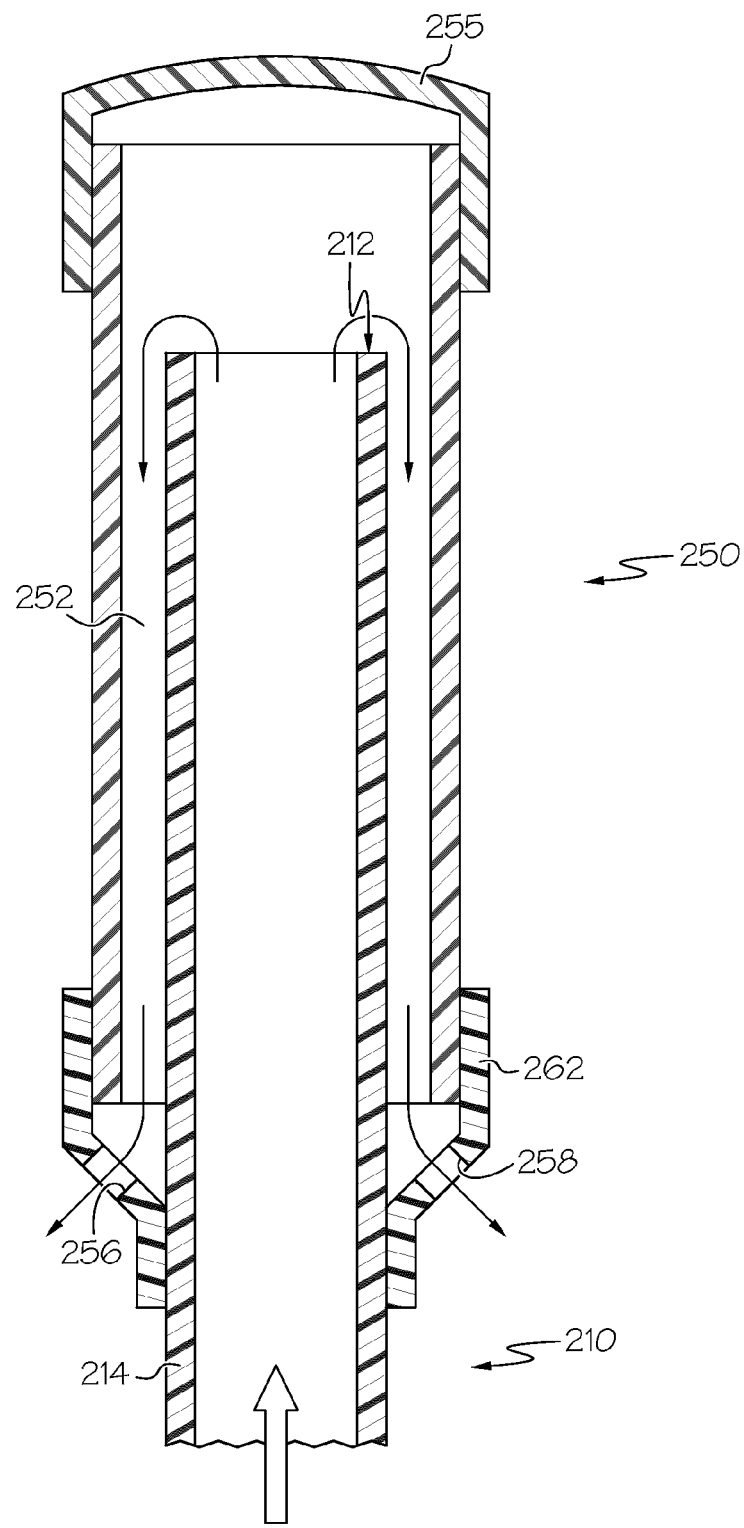
FIG. 4 is a schematic sectional view of the passive valveless gas vent for a landfill of FIG. 3.
Figure 5:
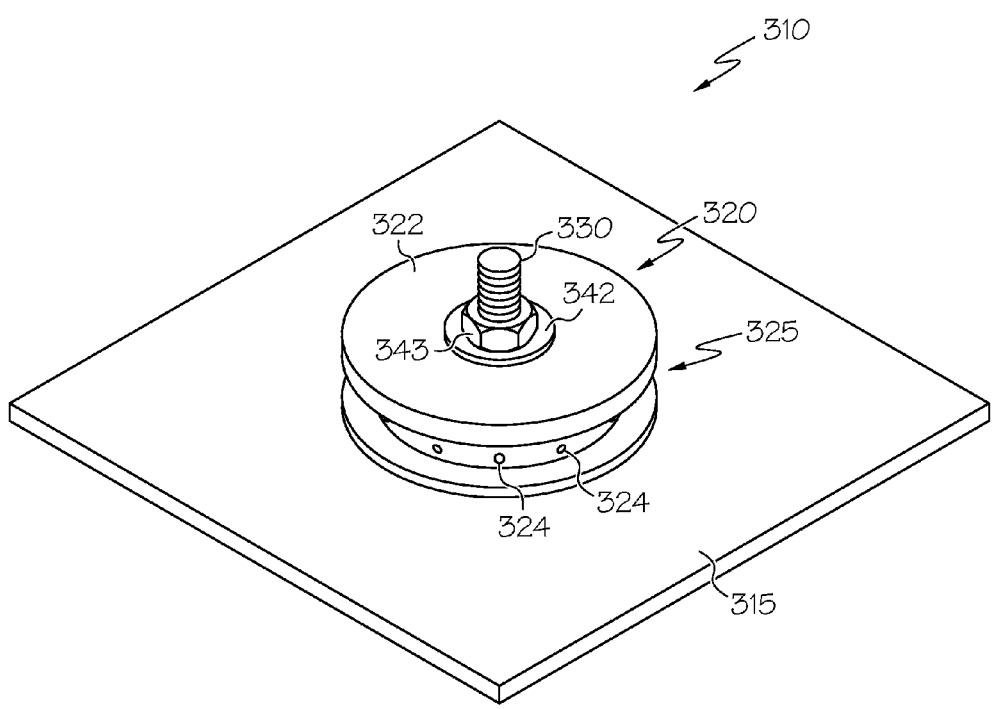
FIG. 5 is a schematic perspective view of a collection manifold portion of the passive valveless gas vent for a landfill of FIG. 3.

With such an arrangement, as best seen in FIG. 4, the gas to be vented flows up from the plenum, through the conduit 210 to its upper discharge end 212. Once exiting the upper end 212 of the conduit 210 and being received in the discharge chamber 252 of the hood 250, the gas turns downwardly and ultimately exits through the lower discharge ports 256, 258 in the hood 250. Thus, the gas is thereby vented to atmosphere.

To install the collection manifold, the collection manifold is placed in the ground under where the geomembrane is (or is to be positioned), with the conduit extending vertically. An opening is made in the geomembrane and the geomembrane is placed over the conduit and above the collection manifold. In this regard there are several ways to provide the opening in the membrane, such as cutting a single slit, cutting an X-shaped pair of slits, cutting a roughly circular hole (such as with a hole saw), punching a hole, etc. After the geomembrane is place over the conduit, the attachment thereto can be secured with the nut (and any optional washers/bosses, gaskets, etc., as described herein). Moreover, in those instances where it is desired to sandwich the geomembrane between two resilient gaskets, a first gasket is placed over the conduit before inserting the conduit up through the geomembrane. The geomembrane can take the form of a simple membrane or can be coupled to synthetic turf (as shown in FIG. 3).

The sub-surface gas to be collected and withdrawn with the present invention can be any of several sub-surface gases, such as natural gas.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A passive valveless gas vent for use at an aperture in a geomembrane that covers a landfill, the passive valveless gas vent comprising:
   a valveless sub-surface gas collection manifold for collecting sub-surface gas from beneath the geomembrane, the collection manifold comprising a plenum for receiving the sub-surface gas, the plenum defining an interior volume;
   a valveless conduit connected to and extending upwardly from the plenum, the conduit communicating with the interior volume of the plenum and having an upper discharge end, the conduit being adapted and provided for extending through the aperture in the geomembrane for communicating the sub-surface gas from within the interior volume of the plenum through the geomembrane; and
   a valveless hood positioned concentrically about an upper portion of the conduit and defining an annular discharge chamber into which the sub-surface gas from the discharge end of the conduit is discharged, the hood also having a discharge outlet for venting the sub-surface gas from within the discharge chamber to atmosphere, and wherein the hood is rigidly affixed to the conduit.

2. A passive valveless gas vent as claimed in claim 1 wherein the hood is substantially cylindrical.

3. A passive valveless gas vent as claimed in claim 1 wherein the conduit is rigidly connected to and extends upwardly from a substantially flat portion of the plenum.

4. A passive valveless gas vent as claimed in claim 1 wherein the hood includes one or more lower discharge ports.

5. A passive valveless gas vent as claimed in claim 1 wherein the hood prevents rain from falling into the conduit.

6. A passive valveless gas vent as claimed in claim 1 wherein the conduit and the hood are made from a weather-resistant material.

7. A passive valveless gas vent as claimed in claim 1 wherein the hood and the conduit are made from PVC.

8. A passive valveless gas vent as claimed in claim 1, wherein the plenum comprises perforations in the base of a recessed peripheral groove of the plenum to provide for the admission of the sub-surface gas into the interior volume of the plenum.

9. A passive valveless gas vent as claimed in claim 1, wherein the conduit further comprises a lower portion and an upper portion and the lower portion is connected to the upper portion of the conduit by a coupling.

10. A passive valveless gas vent as claimed in claim 1, wherein the hood is affixed to the conduit using a reducer positioned at a point below the upper discharge end of the conduit.

11. A passive valveless gas vent for use at an aperture in a geomembrane that covers a landfill, the passive valveless gas vent comprising:
   a valveless sub-surface gas collection manifold for collecting sub-surface gas from beneath the geomembrane, the collection manifold comprising a plenum for receiving the sub-surface gas, the plenum defining an interior volume;
   a valveless conduit connected to and extending upwardly from the plenum, the conduit communicating with the interior volume of the plenum and having an upper discharge end, the conduit being adapted and provided for extending through the aperture in the geomembrane for communicating the sub-surface gas from within the interior volume of the plenum through the geomembrane; and
   a valveless hood positioned concentrically about an upper portion of the conduit and defining an annular discharge chamber into which the sub-surface gas from the discharge end of the conduit is discharged, the hood also having a discharge outlet for venting the sub-surface gas from within the discharge chamber to atmosphere, and wherein the hood is rigidly affixed to the conduit; and
   wherein the sub-surface gas exits the upper end of the conduit, is received in the discharge chamber of the hood, turns and flows downwardly through the discharge chamber, and exits through the discharge outlet.

12. A passive valveless gas vent as claimed in claim 8, wherein the discharge outlet comprises one or more downwardly-facing lower discharge ports.

13. A passive valveless gas vent as claimed in claim 11, wherein the plenum comprises perforations in the base of a recessed peripheral groove of the plenum to provide for the admission of the sub-surface gas into the interior volume of the plenum.

14. A passive valveless gas vent as claimed in claim 11, wherein the conduit further comprises a lower portion and an upper portion and the lower portion is connected to the upper portion of the conduit by a coupling.

15. A passive valveless gas vent as claimed in claim 11, wherein the hood is affixed to the conduit using a reducer positioned at a point below the upper discharge end of the conduit.

16. A passive valveless gas vent as claimed in claim 15, wherein the reducer is in the form of an angled collar that surrounds the upper portion of the conduit and defines the discharge outlet of the hood.

17. A passive valveless gas vent as claimed in claim 11, wherein the discharge outlet of the hood is positioned below the upper discharge end of the conduit.

18. A passive valveless gas vent as claimed in claim 17, wherein the annular discharge chamber is formed between the hood and the upper portion of the conduit.

* * * * *